US007393201B2

(12) United States Patent
Fetter et al.

(10) Patent No.: US 7,393,201 B2
(45) Date of Patent: Jul. 1, 2008

(54) SYSTEM AND APPARATUS FOR MANUFACTURING THERMOPLASTIC MICROPELLETS

(75) Inventors: Richard H. Fetter, Bay City, MI (US); Bruce A. LaFave, Kawkawlin, MI (US); Jamie A. Chomas, Essexville, MI (US)

(73) Assignee: Scheer Bay Limited Partnership, Bay City, MI (US)

( * ) Notice: Subject to any disclaimer, the term of this patent is extended or adjusted under 35 U.S.C. 154(b) by 59 days.

(21) Appl. No.: 11/457,856

(22) Filed: Jul. 17, 2006

(65) Prior Publication Data

US 2007/0154587 A1 Jul. 5, 2007

Related U.S. Application Data

(62) Division of application No. 10/655,411, filed on Sep. 4, 2003, now Pat. No. 7,124,972.

(51) Int. Cl.
*B26D 1/12* (2006.01)
*B29C 47/34* (2006.01)

(52) U.S. Cl. .................. 425/316; 425/308; 425/315; 264/143

(58) Field of Classification Search .................. 425/71, 425/72.1, 308, 310, 313, 315, 316, DIG. 230, 425/302.1, 307, 309; 264/143
See application file for complete search history.

(56) References Cited

U.S. PATENT DOCUMENTS

| 2,587,619 | A | * | 3/1952 | Hofmann ..................... 264/180 |
| 2,975,483 | A | * | 3/1961 | Cooper et al. ................ 264/143 |
| 3,464,826 | A | * | 9/1969 | Ball et al. .................... 426/446 |
| 3,822,042 | A |   | 7/1974 | Roy |
| 3,958,911 | A | * | 5/1976 | Makeham et al. ........... 425/289 |
| 4,025,252 | A | * | 5/1977 | Hunke .......................... 425/67 |
| 4,413,965 | A | * | 11/1983 | Kinoshita et al. ............. 425/71 |
| 4,528,157 | A | * | 7/1985 | Lettner et al. ............... 264/237 |
| 4,530,649 | A | * | 7/1985 | Philipp et al. ................ 425/71 |
| 4,632,752 | A |   | 12/1986 | Hunke |
| 4,838,775 | A | * | 6/1989 | Hunke .......................... 425/67 |
| 4,913,899 | A | * | 4/1990 | Hartig ........................... 425/71 |
| RE33,492 | E |   | 12/1990 | Hunke |
| 5,066,210 | A | * | 11/1991 | Hunke .......................... 425/71 |
| 5,118,270 | A | * | 6/1992 | Keilert et al. ............... 425/72.1 |
| 5,146,822 | A | * | 9/1992 | Noda et al. .................... 83/22 |
| 5,182,115 | A | * | 1/1993 | Nogossek et al. ............. 425/71 |
| 5,242,289 | A | * | 9/1993 | Forgash et al. ................ 425/71 |
| 5,265,507 | A | * | 11/1993 | Noda et al. .................... 83/22 |
| 5,441,394 | A | * | 8/1995 | Keilert et al. ................. 425/71 |
| 5,474,435 | A | * | 12/1995 | Hunke .......................... 425/71 |
| 5,628,947 | A | * | 5/1997 | Keilert ....................... 264/143 |

(Continued)

FOREIGN PATENT DOCUMENTS

DE 19536933 6/1997

(Continued)

*Primary Examiner*—Steven P. Griffin
*Assistant Examiner*—Seyed Masoud Malekzadeh
(74) *Attorney, Agent, or Firm*—Warner Norcross & Judd LLP

(57) ABSTRACT

A highly efficient pelletizing system for making thermoplastic micropellets includes and extruder for extruding molten thermoplastic into thermoplastic strands. A rotor cuts the strands into micropellets. The rotor has more than four teeth per inch and operates at a very high speed.

14 Claims, 2 Drawing Sheets

U.S. PATENT DOCUMENTS

| | | | |
|---|---|---|---|
| 5,658,601 A * | 8/1997 | Hoshi | 425/289 |
| 5,787,604 A | 8/1998 | Kreuz et al. | |
| 5,863,564 A * | 1/1999 | Yoon | 425/71 |
| 5,888,554 A * | 3/1999 | Zollitsch et al. | 425/71 |
| 6,039,905 A * | 3/2000 | Zollitsch et al. | 264/143 |
| 6,347,932 B1 * | 2/2002 | Kim | 425/71 |
| 2002/0028115 A1 | 3/2002 | Voigt et al. | |
| 2002/0044987 A1* | 4/2002 | Hawley et al. | 425/585 |
| 2003/0188648 A1* | 10/2003 | Zembko et al. | 101/232 |
| 2004/0025658 A1* | 2/2004 | Fisher et al. | 83/663 |
| 2007/0154587 A1* | 7/2007 | Fetter et al. | 425/289 |

FOREIGN PATENT DOCUMENTS

| | | | |
|---|---|---|---|
| EP | 0013575 | * | 1/1980 |
| JP | 11-58373 | * | 3/1999 |
| JP | 11-291239 | * | 10/1999 |
| JP | 2001-287223 | * | 10/2001 |

* cited by examiner

SYSTEM AND APPARATUS FOR MANUFACTURING THERMOPLASTIC MICROPELLETS

RELATED APPLICATIONS

This is a divisional of application Ser. No. 10/655,411, filed Sep. 4, 2003 (now U.S. Pat. No. 7,124,972).

BACKGROUND OF THE INVENTION

This invention relates to plastic strand granulation and, more specifically, to an improved rotary helical cutter and method for manufacturing thermoplastic micropellets.

Thermoplastic micropellets are similar to thermoplastic pellets, but are much smaller. Micropellets have a diameter of about 0.020 inches and a length of about 0.020 inches. Thermoplastic micropellets have many uses. For example, micropellets are used as a blasting media.

Thermoplastic pellets are produced by extruding a thermoplastic strand. After cooling, the strand is send to a granulator. Within the granulator, a rotor cuts the thermoplastic strands into pellets.

Granulators for making traditional pellets have been used to make the thermoplastic micropellets. The results have not been entirely satisfactory.

Because traditional thermoplastic pellets are often melted before being formed into a final product, the shape and size of the pellets could vary without cause for concern. Micropellets, on the other hand, are an end product. Because they are often used as a projectile in a machine, the tolerances for the shape of the micropellet are much higher.

The waste from conventional granulators has been very high. To achieve even this modest level of yield, the machines must operate relatively slowly. Such a low yield coupled with a relatively slow operating speed results in increased costs in manufacturing micropellets as well as delays in production.

An improved apparatus and method for manufacturing micropellets at high efficiency and with an increased speed is highly desirable.

SUMMARY OF THE INVENTION

The aforementioned problems are overcome in the present invention by providing a high-efficiency and high throughput granulator for manufacturing thermoplastic micropellets.

A pelletizing system for manufacturing micropellets consists of an extruder and a rotor. The extruder produces several strands of molten thermoplastic. The rotor then cuts the thermoplastic strands into micropellets. The rotor has a plurality of teeth and has a tooth density of less than about one-quarter of an inch per tooth.

Previous granulators produced excessive wind around the thermoplastic strand, causing the strand to move prior to cutting. The low tooth density of the rotor decreases the wind, minimizing the movement of the strand. Since the strand does not move during cutting, the produced micropellets have a uniform shape and size. The yield of the granulator is thereby substantially improved.

The pelletizing system also includes a pulling device for transporting the thermoplastic strand from the extruder to the rotor. An upper draw off roller and a lower draw off roller carry the strands to the rotor. Preferably, the upper draw off roller is free-wheeling while the lower draw off roller is powered. The upper draw off roller and the lower draw off roller have a nip, and the thermoplastic strands leave the nip at an angle of about three degrees. The rotor in such a pelletizing system can operate at an angular velocity of more than 1000 revolutions per minute.

In another embodiment of the invention, a granulator for making thermoplastic micropellets from a thermoplastic strand has a rotor for cutting the thermoplastic strand into micropellets. The rotor has a tooth density of less than about one-quarter inch per tooth. Feeding means feeds the thermoplastic strand to the rotor. The granulator also has an exit for removing the thermoplastic micropellets from the granulator.

The rotor of such a granulator is generally cylindrical, and has teeth longitudinally positioned and uniformly placed about the rotor. The rotor can operate with an angular velocity of more than 1000 revolutions per minute.

In such a granulator, the feeding means could be a first draw off roller and a second draw off roller. The first draw off roller is powered and the second draw off roller is not powered. The first draw off roller is located below the second draw off roller and the first draw off roller and the second draw off roller form a nip.

The efficiency and throughput of such a micropellet granulator is exceptional. The use of yield of such a system is almost 99%. Other micropellet granulators have a yield of about 25%. The rotor is rotating at angular velocity of 1000 rpm which is three to four times faster than other micropellet granulators. Because the rotor also has more teeth per inch of circumference, the thermoplastic strand can be fed to the rotor more quickly. The rotor produces in gross quantity five to eight times more micropellets than conventional rotors producing micropellets.

The significantly increased yield and throughput indicate that the invention is a significant advance in the production of thermoplastic micropellets.

These and other objects, advantages and features of the invention will be more readily understood and appreciated by reference to the detailed description of the drawings.

DETAILED DESCRIPTION OF THE DRAWINGS

Figure 1:
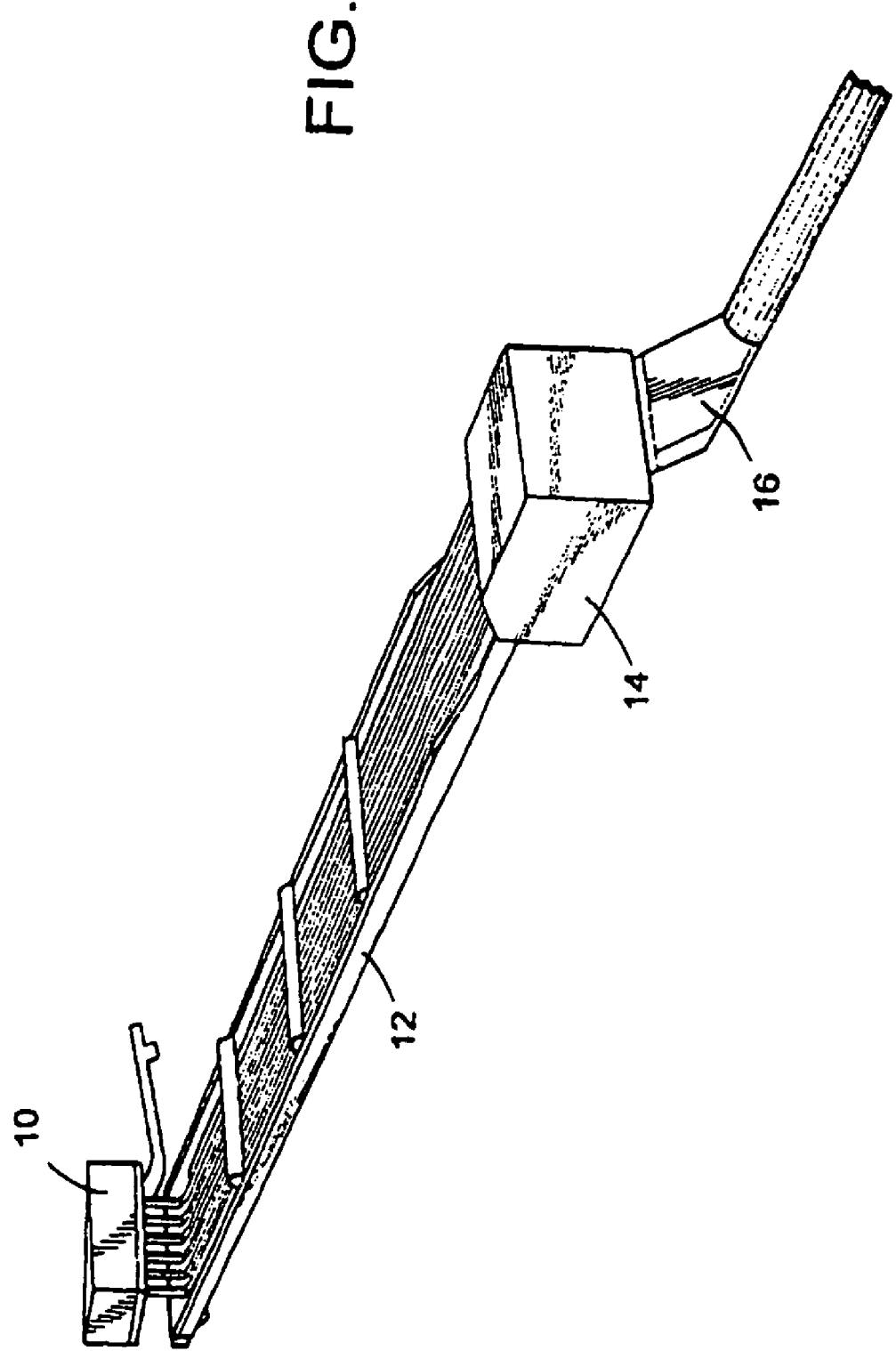
FIG. 1 shows a pelletizing system for manufacturing thermoplastic micropellets.

FIG. 1 shows a pelletizing system for manufacturing thermoplastic micropellets. Pelletizing system 5 includes extruder 10. Extruder 10 produces several strands of molten thermoplastic. The molten thermoplastic strands fall into water bath 12. The strands are manually fed to granulator 14. Granulator 14 chops the thermoplastic strands into micropellets. The micropellets could be carried away by belt 16 or could be placed in a container. After chopping, the micropellets are screened to remove any oversize pellets.

Figure 2:
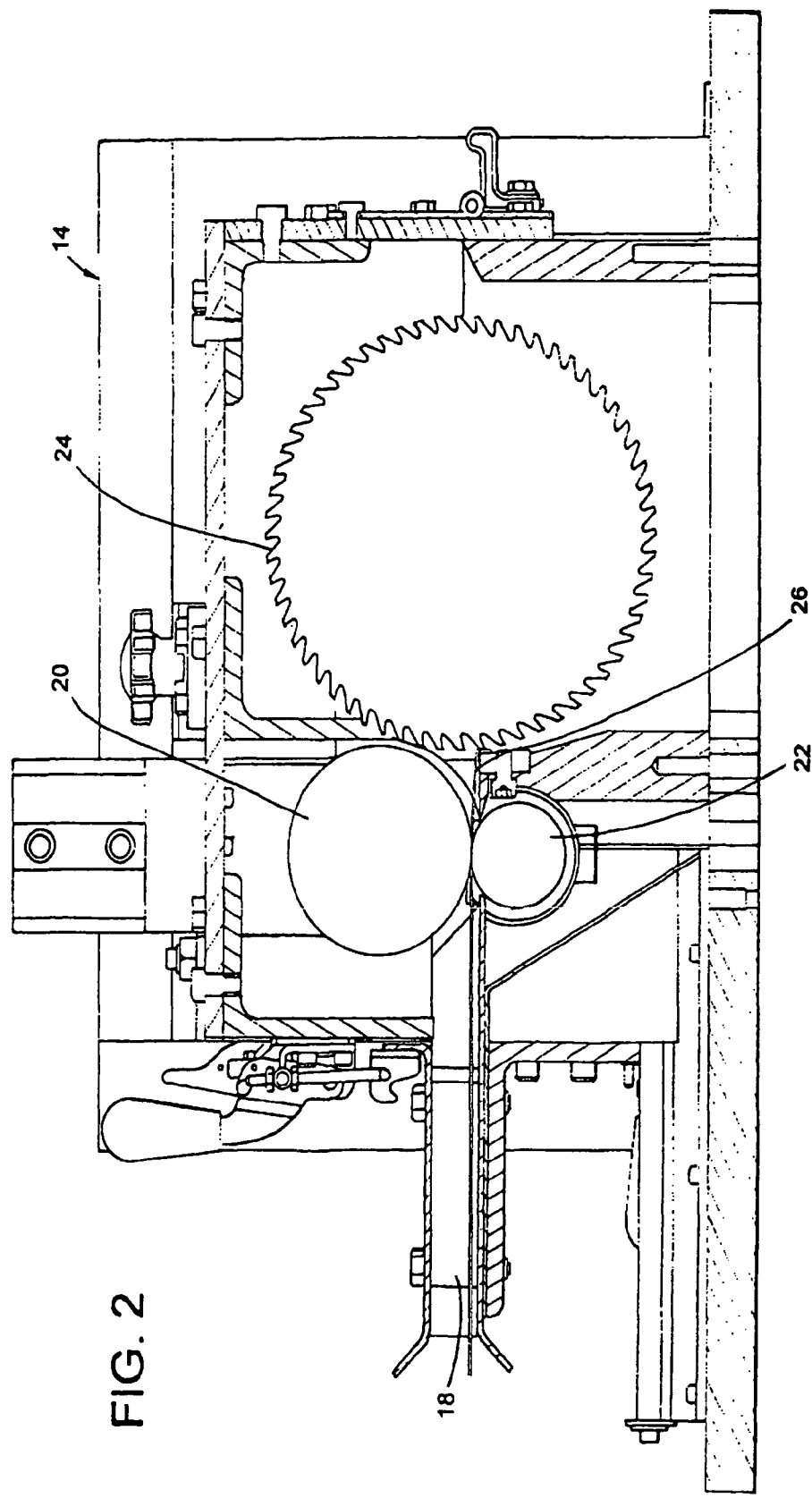
FIG. 2 shows a granulator for use in manufacturing thermoplastic micropellets.

FIG. 2 is a side view of granulator 14. The thermoplastic strands enter through inlet 18. The thermoplastic strands enter a nip formed between upper draw off roller 20 and lower draw off roller 22. Only lower draw off roller 22 is powered. The upper draw off roller 20 is not power. Thus, only lower draw off roller 22 supplies a pulling force on the thermoplastic strands.

The center of upper draw off roller 20 is offset from the center of lower draw off roller 24 by approximately 0.11 inches. The strand comes to rest upon shelf 26. A portion extends over shelf 26 and into rotor 24. The strand has an exit angle of about 3 degrees with the shelf 26. Rotor 24 then cuts the thermoplastic strands into micropellets.

Rotor 24 is a cylinder and rotates counterclockwise with an angular velocity of about 1000 rpm, which is approximately twice as fast as conventional rotors used for manufacturing micropellets. Cut point 26 is the position where rotor 24 intersects the thermoplastic strand and separates the strand into micropellets.

Rotor 24 has a large number of teeth. The tooth density for rotor 24 is defined as the circumference divided by the number of teeth. In a usual application, rotor 24 will have a diameter of about eight inches with at least about 120 teeth. The tooth density of rotor 24 would be no more than about 0.209 inches per tooth. Conventional rotor for micropellets have a tooth density of about 0.785 inches per tooth.

The use of rotor 24 with such a low tooth density results in a yield of close to 99%. When the yield is factored in, the micropellet system disclosed herein produces in excess of 600% more micropellets meeting or exceeding specifications than the conventional granulator. Further, because the system produced micropellets of a consistent size and shape, the time required to screen the micropellets is also significantly reduced.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A granulator for making thermoplastic micropellets from a thermoplastic strand comprising:
   a rotor for cutting the thermoplastic strand into micropellets, where the rotor has a plurality of teeth, the rotor having a tooth density of less than about one-quarter inch per tooth;
   feeding means for feeding the thermoplastic strand to the rotor and deflecting the thermoplastic strand over a nip before reaching said rotor; and
   an exit for removing the thermoplastic micropellets from the granulator.

2. The granulator of claim 1 where the rotor is generally cylindrical, and the rotor has a plurality of teeth, and the plurality of teeth are longitudinally and uniformly placed about the rotor.

3. The granulator of claim 2 where the rotor rotates at an angular velocity, and the angular velocity is more than 500 revolutions per minute.

4. The granulator of claim 3 where the angular velocity is more than 900 revolutions per minute.

5. The granulator of claim 4 where the angular velocity more than 1000 revolutions per minute.

6. The granulator of claim 1 where the feeding means comprising a first draw off roller and a second draw off roller.

7. The granulator of claim 6 where the first draw off roller is powered and the second draw off roller is not powered.

8. The granulator of claim 7 where the first draw off roller is located above the second draw off roller and the first draw off roller and the second draw off roller form the nip.

9. The granulator of claim 8 where the first draw off roller has a first draw off roller center and the second draw off roller has a second draw off roller center, and the first draw off roller center is offset from the second draw off roller center by about less than fifteen one-hundredths of an inch.

10. The granulator of claim 9 where the first draw off roller center is offset from the second draw off roller center by about one-tenth of an inch.

11. The granulator of claim 10 where the rotor has a cut point, and a nip length from the nip to the cut point is less than 2 inches.

12. The granulator of claim 11 where the nip length is about two inches.

13. A granulator for making thermoplastic micropellets from a thermoplastic strand comprising:
   a rotor for cutting the thermoplastic strand into micropellets, where the rotor has a plurality of teeth, the rotor having a tooth density of less than about one-quarter inch per tooth and the rotor has a cut point, and a nip length from the nip to the cut point is less than 2 inches:
   feeding means for feeding the thermoplastic strand to the rotor, the feeding means comprising a first draw off roller and a second draw off roller and the first draw off roller is powered and the second draw off roller is not powered, where the first draw off roller is located above the second draw off roller and the first draw off roller and the second draw off roller form the nip and has a first draw off roller center and the second draw off roller has a second draw off roller center, and the first draw off roller center is offset from the second draw off roller center by about less than fifteen one-hundredths of an inch and the nip length from the nip to the cut point is less than 2 inches and thermoplastic strand is deflected by less than four degrees over the nip length; and
   an exit for removing the thermoplastic micropellets from the granulator.

14. The granulator of claim 13 where and the thermoplastic strand is deflected by about three degrees over the nip length.

* * * * *